(12) United States Patent
Shibayama et al.

(10) Patent No.: US 6,471,047 B2
(45) Date of Patent: Oct. 29, 2002

(54) CONVEYOR CHAIN FOR USE IN CROSSED DELIVERY CONVEYOR

(75) Inventors: Katsutoshi Shibayama, Osaka (JP); Yoshihiro Murakami, Osaka (JP); Takashi Ishii, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/815,993

(22) Filed: Mar. 23, 2001

(65) Prior Publication Data
US 2001/0025770 A1 Oct. 4, 2001

(30) Foreign Application Priority Data
Mar. 24, 2000 (JP) ......................... 2000-083563

(51) Int. Cl.[7] ................ B65G 15/30; B65G 17/00; B65G 17/06; B65G 17/38
(52) U.S. Cl. .................. 198/844.1; 198/850; 198/853
(58) Field of Search ................. 198/850, 851, 198/853, 844.1

(56) References Cited
U.S. PATENT DOCUMENTS

| | | | |
|---|---|---|---|
| 1,966,659 A | | 7/1934 | Wynne et al. |
| 2,775,338 A | * | 12/1956 | Scmalzried ............ 198/850 |
| 3,269,526 A | * | 8/1966 | Imse et al. ............ 198/853 |
| 4,776,454 A | * | 10/1988 | Momose ............... 198/853 |
| 5,125,504 A | * | 6/1992 | Corlett et al. ......... 198/850 |
| 5,377,819 A | * | 1/1995 | Horton et al. ......... 198/850 |
| 5,816,389 A | | 10/1998 | Zijderveld |

* cited by examiner

Primary Examiner—Christopher P. Ellis
Assistant Examiner—Gene O. Crawford
(74) Attorney, Agent, or Firm—Howson & Howson

(57) ABSTRACT

A conveyor chain comprises first and second links connected together articulately. The first links each comprise a link body, an article loading portion, and a pair of overhanging slats. The second links each comprise a link body and an article loading portion. The first and second links are connected together in an alternate manner at an equal pitch. The overhanging slats of each of the first links extend longitudinally of the conveyor chain along both side edges of the associated second link so as to surround the side edges of the second link. Articles easy to fall down can be conveyed and delivered stably in a crossed delivery conveyor.

6 Claims, 7 Drawing Sheets

CONVEYOR CHAIN FOR USE IN CROSSED DELIVERY CONVEYOR

BACKGROUND OF THE INVENTION

1. Field of the Invention

The present invention relates to a conveyor chain for use in a crossed delivery conveyor, the crossed delivery conveyor comprising a first conveyor for conveying articles in a first direction and a second conveyor for conveying articles in a direction orthogonal to the first direction, the second conveyor being disposed in abutment against a side edge of the first conveyor.

2. Description of the Related Art

Figure 8:
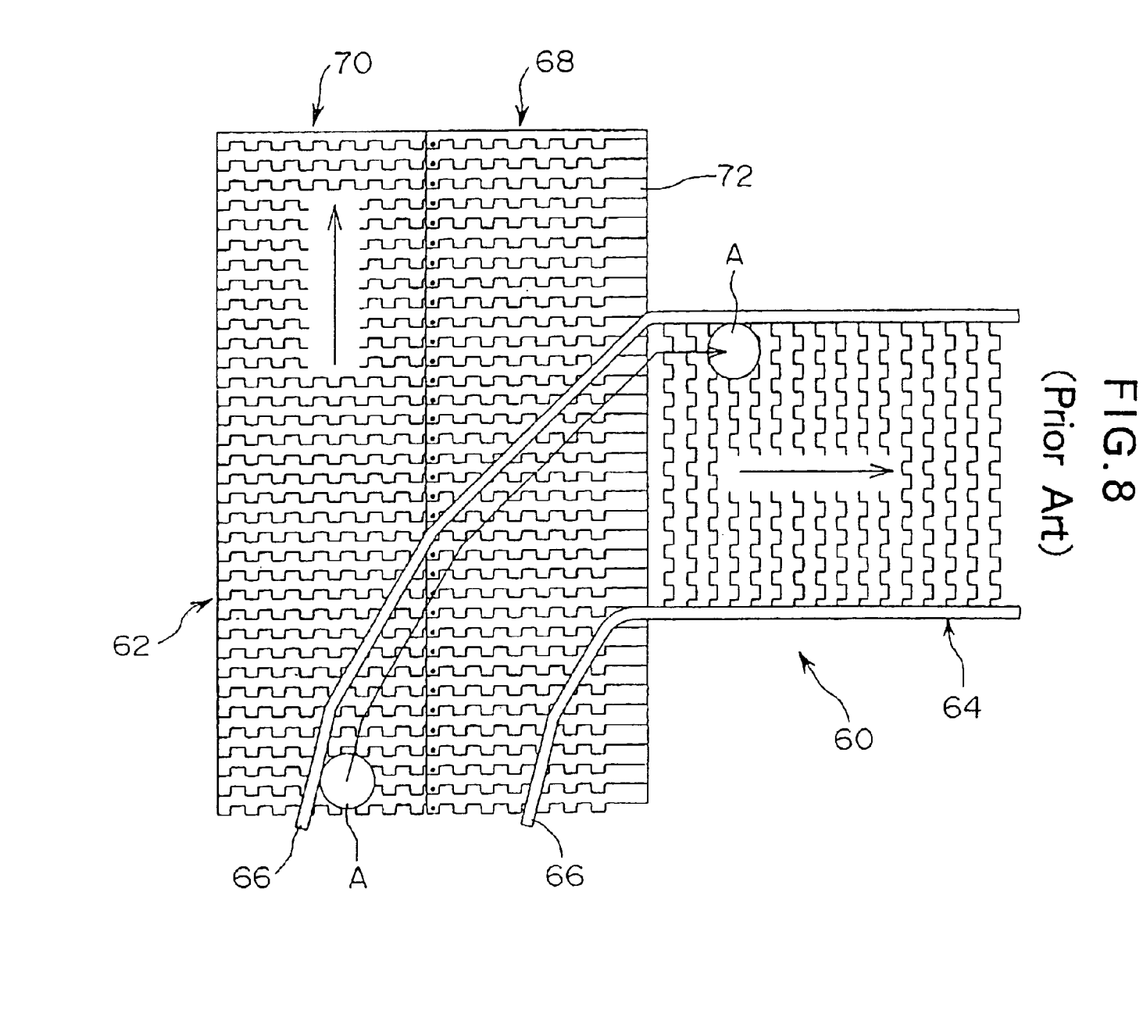
FIG. 8 is a plan view of a conventional crossed delivery conveyor.

FIG. 8 shows an example of a crossed delivery conveyor. The crossed delivery conveyor, designated by 60, comprises a first conveyor 62 for conveying articles in a first direction and a second conveyor 64 for conveying articles in a direction orthogonal to the first direction. The second conveyor 64 is disposed in proximity to a side edge of the first conveyor 62. In the crossed delivery conveyor 60 of this type, as indicated with arrows in FIG. 8, guides 66 are provided for loading an article A from the first conveyor 62 onto the second conveyor 64 or for discharging an article from the second to the first conveyor.

The first conveyor 62 shown in FIG. 8 comprises conveyor chains 68 and 70 arranged in two lines. In each of the chains 68 and 70, a plurality of links provided with article loading portions are connected together in an endless form. In the chain 68, located on the side closest to the second conveyor 64, each of the links is provided with an overhanging slat 72 extending from the associated article loading portion in a direction orthogonal to the article conveying direction of the chain.

Figure 9:
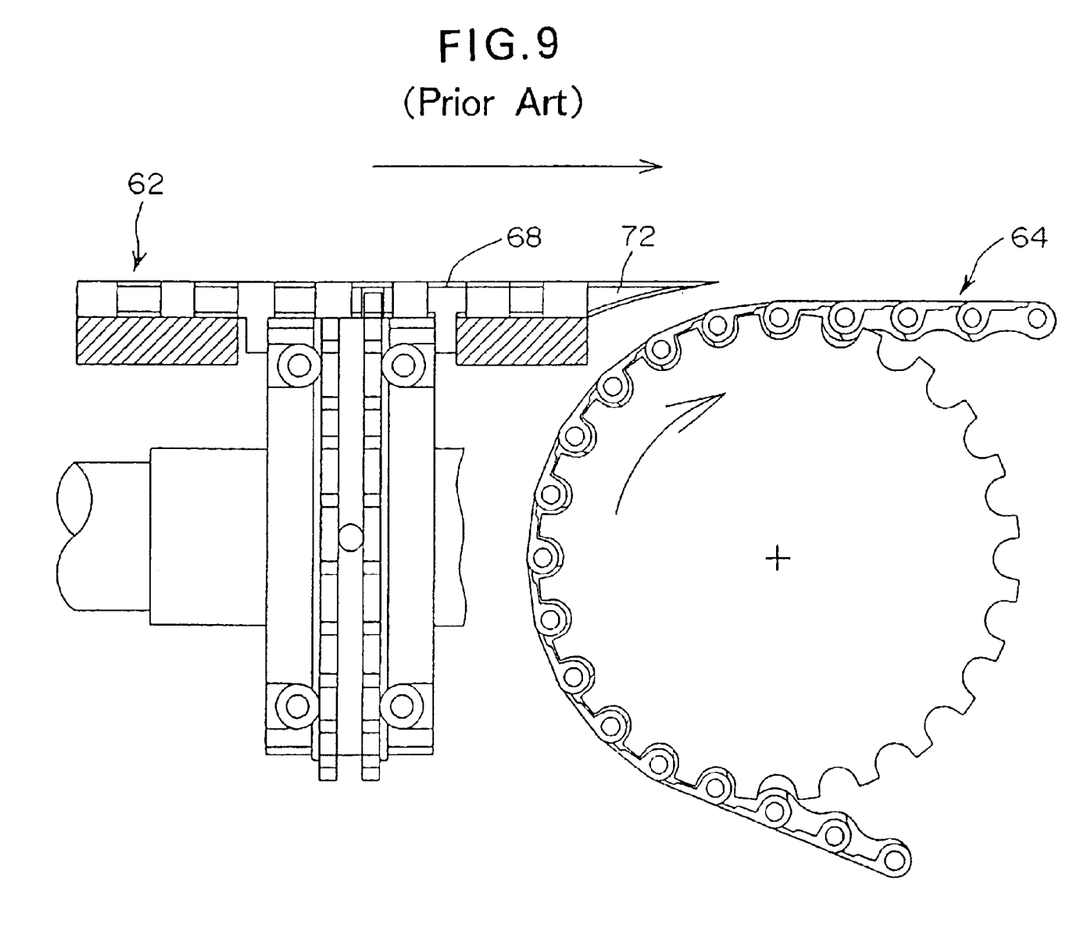
FIG. 9 is an enlarged sectional view of the conventional crossed delivery conveyor shown in FIG. 8.

As shown in detail in FIG. 9, the second conveyor 64 is disposed so as to extend under the first conveyor 62 and therefore the overhanging slats 72 are needed for the transfer of articles from the first conveyor 62 onto the second conveyor 64. An article is moved from an article loading portion on the first conveyor 62 to overhanging slats 72 while being guided by the guides 66 (FIG. 8) and is then loaded onto the second conveyor 64 from the overhanging slats 72.

In the conveyor it is desirable that the chain pitch of a conveyor chain be set small. This is because by setting the chain pitch small, it is possible to suppress a polygonal motion of the chain and hence possible to convey articles in a stable manner.

On the other hand, when articles are loaded and discharged on a crossed delivery conveyor, it is preferable that the chain pitch be set large. This is because by setting the chain pitch large, the number of overhanging slats 72 which the article straddle when moving between the first and second conveyors 62, 64 becomes smaller, permitting a stable delivery of the article.

For example, in the case where unstable articles such as petaloid-shaped PET bottles are to be conveyed using the crossed delivery conveyor, it is important that the articles be kept stable not only during the regular conveyance on the constituent conveyors but also during transfer between the conveyors. The relation of the chain pitch to the article stability is not considered at all in the conventional crossed delivery conveyor.

Figure 10:
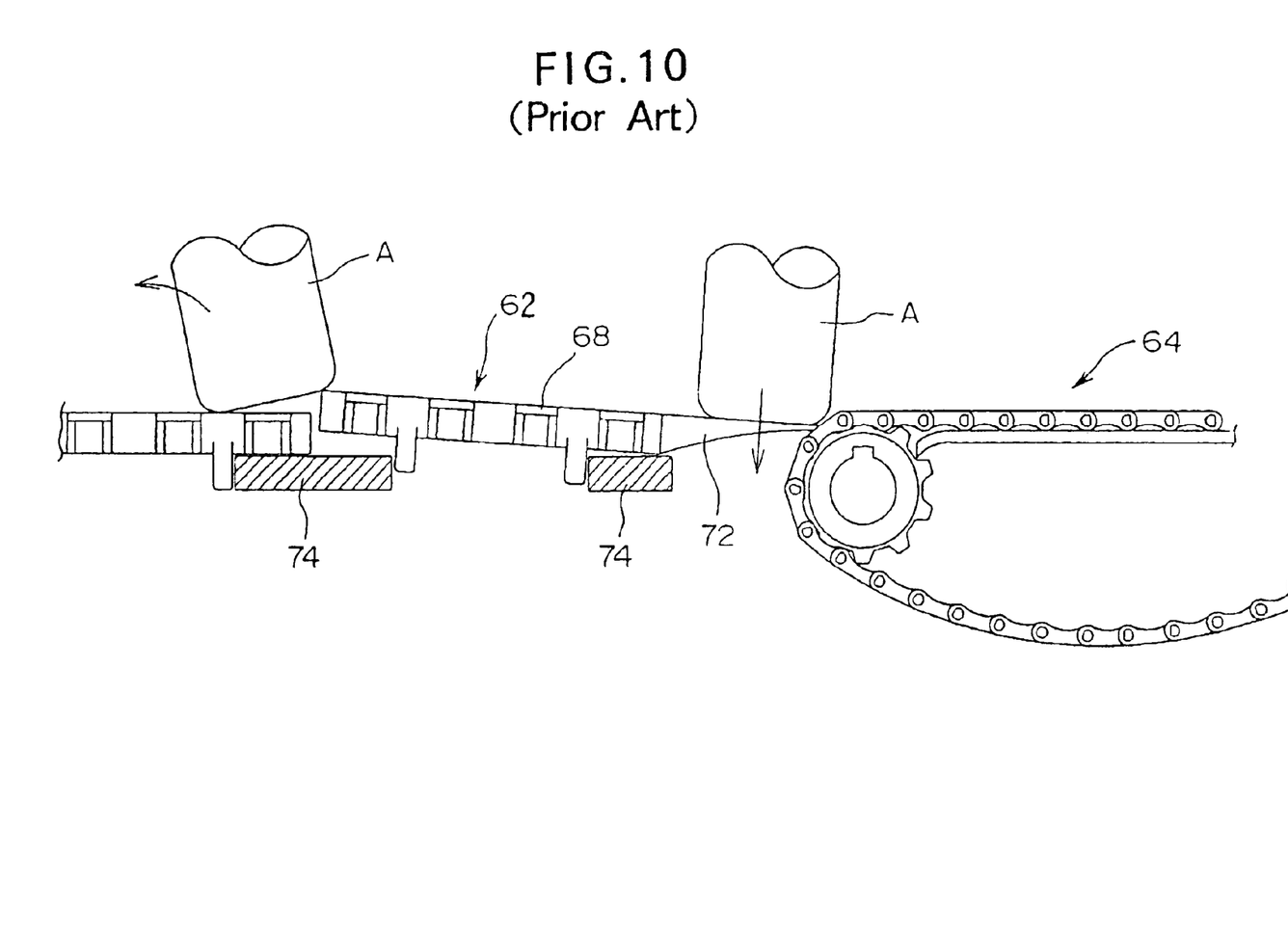
FIG. 10 is a front view showing the operation of conveyors as constituents of the crossed delivery conveyor shown in FIGS. 8 and 9.

FIG. 10 illustrates the behavior of an article when transferred onto an overhanging slat 72 between the first and second conveyors 62, 64. The overhanging slat 72 is attached to a link in a cantilevered state. When an article A has moved onto the overhanging slat 72, a moment acting to cause tilting of the entire link is exerted on the link.

In the conventional crossed delivery conveyor, rails 74 support links for defining a track of the chain, but no consideration is given about how the load acting on each overhanging slat 72 is to be borne. Therefore, when the article A has moved from the article loading portion to the overhanging slat 72, there is a fear that the load of the article A may cause the chain to tilt and that consequently the article present on the overhanging slat may fall down.

Moreover, in the first conveyor 62, the left-hand conveyor chain 70 and the right-hand conveyor chain 68 with overhanging slats 72 are separate chains, so when the right-hand chain 68 with overhanging slats 72 tilts, there occurs a difference in height at a joint portion between the right and left chains. The article A being moved toward the second conveyor 64 along the guides 66 (FIG. 8) is likely to be caught in such a stepped portion at its bottom and may fall down. Likewise, the article A when straddling the right and left chain 68, 70 is likely to fall down upon tilting of the right chain 68.

Further, the spacing between the conveyor chains of the first and second conveyors 62, 64 is set narrow so that articles can be transferred stably from one to the other conveyor, so if the conveyor chains tilt even slightly, there also arises the problem that the chain 68 of the first conveyor 62 comes into contact with the second conveyor 64.

Further, the crossed delivery conveyor shown in FIG. 8 takes into account only loading articles to, and discharging articles from, one side. In the first conveyor 62, therefore, the left hand conveyor chain 70 in the figure does not function at all as a crossed delivery conveyor. If the article loading and discharging directions are different, it is necessary to substitute a separately manufactured conveyor for the left hand conveyor chain 70. This is very uneconomical.

SUMMARY OF THE INVENTION

It is an object of the present invention to provide a conveyor chain capable of stably conveying articles, particularly petaloid-shaped articles easy to fall down such as PET bottles, in a crossed delivery conveyor and also capable of delivering such articles stably between constituent conveyors of the crossed delivery conveyor.

Another object of the present invention is to provide a conveyor chain which prevents tilting of overhanging slats during the delivery of articles between constituent conveyors of a crossed delivery conveyor.

A further object of the present invention is to provide a conveyor chain capable of loading and discharging articles in both right and left directions in a crossed delivery conveyor.

According to the present invention, for achieving the above-mentioned objects, there is provided a conveyor chain for use in a crossed delivery conveyor, comprising a plurality of links connected together in an endless form, the links being each provided with an article loading portion. The links are comprised of first links and second links, the first links being each sandwiched in between two adjacent ones of the second links in a conveyance direction of the conveyor chain to constitute an endless conveyor chain. The first links are each provided with an overhanging slat which extends in a direction orthogonal to the conveyance direction of the conveyor chain from the article loading portion of the first link. The overhanging slat extends also in the conveyance direction of the conveyor chain along a side edge of the article loading portion of the associated second link, and the overhanging slat of each of the first links is adjacent to the overhanging slats of preceding and succeeding ones of the first links.

In a crossed delivery conveyor provided with guides for loading articles from a first conveyor to a second conveyor or for discharging articles from the second to the first conveyor, the conveyor chain of the present invention is used mainly in the first conveyor.

For example, in case of loading articles from the first to the second conveyor, the articles are in a loaded state onto article loading portions of constituent links in the conveyor chain of the first conveyor. As the conveyor chain is operated, the articles are conveyed in the conveyance direction of the first conveyor. At this time, a velocity component of the articles lies in only the conveyance direction.

In case of loading an article onto the second conveyor at an intermediate position of the first conveyor, the article moves along a guide. At this time, on the first conveyor the article moves with two velocity components in both conveyance direction and a direction orthogonal thereto.

When an article present on any of the first links moves in a direction orthogonal to the conveyance direction, it moves from the article loading portion on the first link to an overhanging slat of the first link. When an article present on any of the second links moves in a direction orthogonal to the conveyance direction, it moves first to an overhanging slat of the associated first link from the article loading portion on the second link. Thereafter, both articles are loaded onto the second conveyor. Thus, the article loaded on the first link and the article on the second link each move onto an overhanging slat of the first link and thereafter loaded onto the second conveyor.

The pitch of the conveyor chain is determined by a uniform pitch of all the links including the first and second links. On the other hand, the pitch of the overhanging slats is determined by the pitch of the first links provided with the overhanging slats.

For example, in a conveyor chain having first and second links arranged alternately, the pitch of overhanging slats is twice as large as the chain pitch. For example, in a conveyor chain wherein each of first links is disposed at every two second links, the pitch of overhanging slats is three times as large as the chain pitch.

As noted earlier, for suppressing a polygonal motion of the chain and conveying articles stably, it is preferable that the chain pitch be set small. On the other hand, in case of loading and discharging articles in a crossed delivery conveyor, it is preferable that the pitch of a chain provided with overhanging slats be set large. In the present invention, the pitch of only overhanging slats can be changed to twice, three times, . . . of the chain pitch without changing the chain pitch. As a result, when an article is loaded or discharged between the first and second conveyors, the number of overhanging slats which the article straddle becomes smaller, thus permitting a stable delivery of article between the conveyors.

DETAILED DESCRIPTION OF THE PREFERRED EMBODIMENT

A conveyor chain for use in a crossed delivery chain according to an embodiment of the present invention will be described hereunder with reference to the accompanying drawings. This conveyor chain is for use in the first conveyor described above in connection with the prior art out of the two conveyors as constituents of a crossed delivery conveyor.

Figure 1:
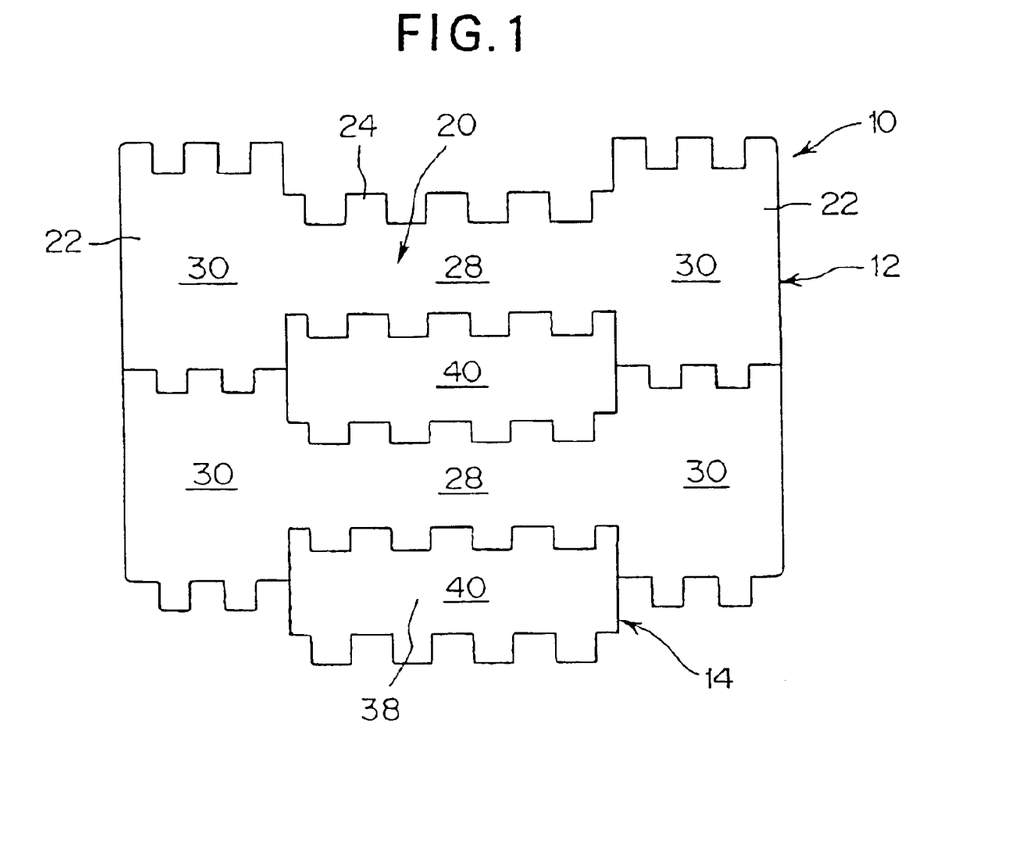
FIG. 1 is a plan view of a conveyor chain for used in a crossed delivery conveyor according to the present invention.
Figure 2:
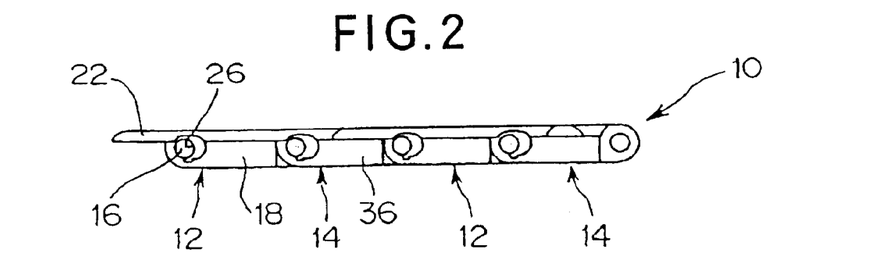
FIG. 2 is a side view of the conveyor chain shown in FIG. 1.

FIG. 1 is a plan view of a conveyor chain and FIG. 2 is a side view thereof. The conveyor chain, designated by 10, comprises first links 12 and second links 14, which are connected together articulately by means of pins 16. The pins 16 are prevented from coming off the links 12 and 14. In this embodiment, the first and second links 12, 14 are arranged alternately one by one. However, the second links 14 may be provided in an integer multiple of the first links 12. For example, two second links 14 may continue for one first link 12, or three second links 14 may continue for one first link 12.

Figure 3:
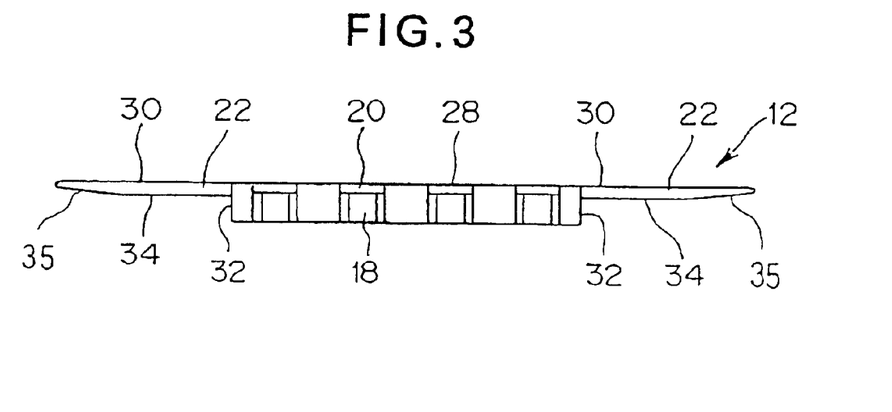
FIG. 3 is a front view of a first link used in the conveyor chain.
Figure 4:
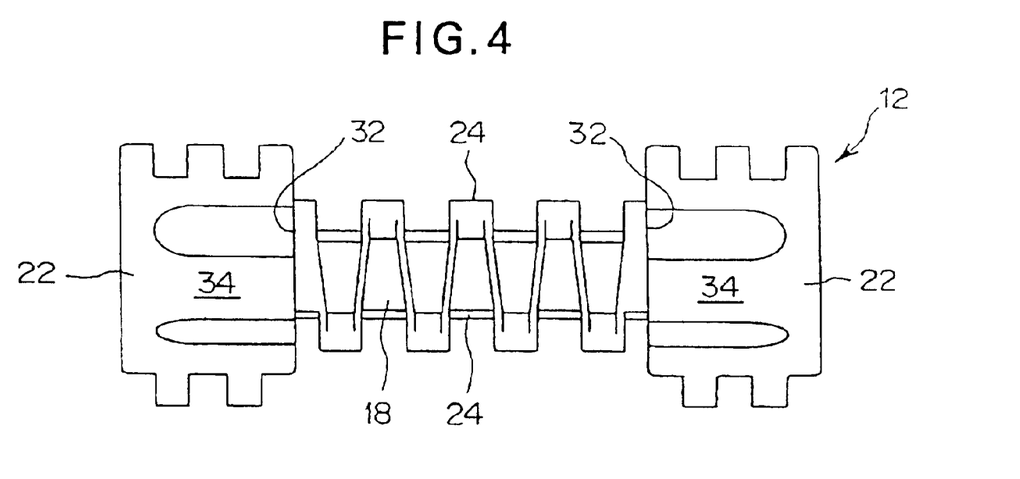
FIG. 4 is a bottom view of the first link.

FIG. 3 is a front view of each first link 12 and FIG. 4 is a bottom view of the first link 12. As shown in FIGS. 3 and 4, the first link 12 comprises a link body 18 which is connected to preceding and succeeding links by the pin 16, an article loading portion 20 provided on top of the link body 18, and a pair of overhanging slats 22 extending to both sides from the link body 18. The first link 12 is formed from a synthetic resin such as polyacetal. The link body 18, the article loading portion 20 and the overhanging slats 22 are formed integrally by molding a resin.

The link body 18 has a concave-convex portion 24 whose front and rear portions are out of phase so as to engage adjacent second links 14 through slight gaps. A bush hole 26 (FIG. 2) is formed transversely through the concave-convex portion 24. The pin 16 is inserted through the bush hole 26 to connect adjacent links articulately with each other.

The article loading portion 20 has a flat loading surface 28 for conveying an article stably. The article loading portion 20 is of the same width as the link body 18.

The right and left overhanging slats 22 are of the same shape. Each overhanging slat 22 has a flat loading surface 30 formed flush with the loading surface 28 of the article loading portion 20. As shown in detail in FIG. 3, each overhanging slat 22 extends transversely from the loading surface 28 of the article loading portion 20 of the link body 18 and has a side edge parallel to the conveyance direction of the conveyor chain 10. The right and left overhanging slats 22 are formed thinner than the link body 18, whereby a stepped portion is formed between the link body 18 and each overhanging slat 22. In such stepped portions, vertical flat surfaces 32 are formed respectively on both sides of the link body 18. On the back of each overhanging slat 22 and on the link body 18 side is formed a horizontal flat surface 34 which is parallel to the loading surface 30.

The second links 14 each have a link body 36 and an article loading portion 38. An upper surface of the article loading portion 38 is a flat loading surface 40 formed flush with the loading surface 28 of the article loading portion 20 in each first link 12. However, each second link 14 is not provided with an overhanging slat. Other constructional points are the same as the first link 12.

In this embodiment, the overhanging slats 22 of the first link 12 extend in the longitudinal direction of the conveyor chain 10 along both side edges of the second link 14 so as to surround the side edges of the second link. The overhanging slats 22 of one first link 12 are in contact with the overhanging slats 22 of the preceding or succeeding first link 12. Preceding or succeeding overhanging slats 22 are engaged together through concave-convex portions 24.

The loading surface 28 of the article loading portion 20 in the first link 12, the loading surfaces 30 of the overhanging slats 22, and the loading surface 40 of the article loading portion 38 in the second link 14 constitute a conveyance surface for conveying an article stably.

In this embodiment, the first and second links 12, 14 are connected together alternately at an equal pitch, which is a small pitch to suppress a polygonal motion of the chain. Since the conveyor chain can be allowed to travel at a small pitch while conveying articles as loaded on the article loading portions, the stability of the articles being conveyed is improved.

On the other hand, the pitch of the overhanging slats 22 is twice as large as the chain pitch. As a result, an article seldom straddles two overhanging slats 22 at the time of transfer to or from another conveyor. Therefore, it becomes less likely for an article to fall down even at the time of delivery of the article as in a crossed delivery conveyor.

Figure 5:
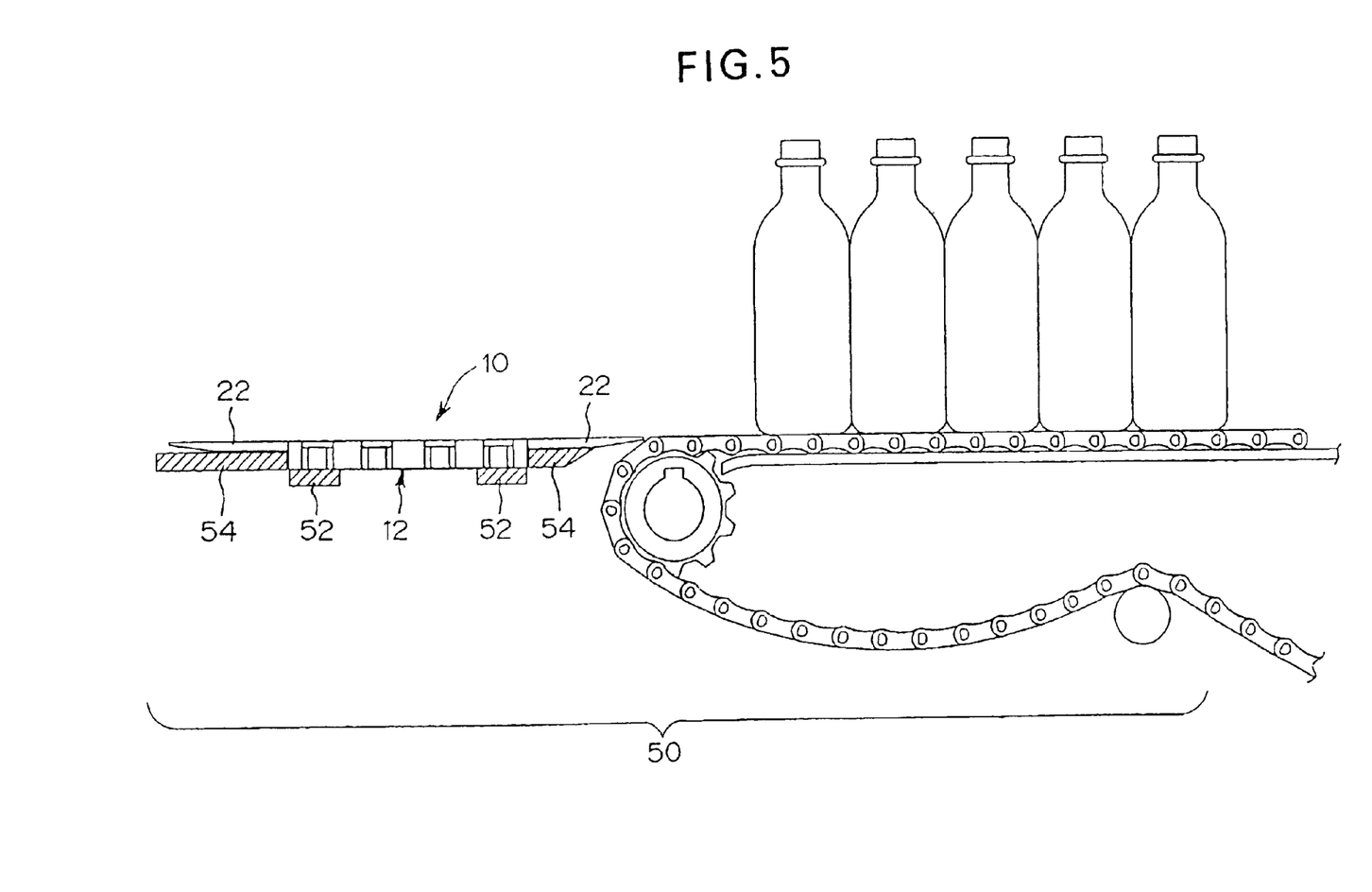
FIG. 5 is a front view illustrative of the operation of a crossed delivery conveyor which uses the conveyor chain shown in FIG. 1.

FIG. 5 shows an example of using a conveyor 50, including a support structure for the conveyor chain 10. A support rail group comprises a pair of rails 52 which support,the undersides of both edges of the link body 18 (FIGS. 3 and 4) and a pair of rails 54 which are in contact with the vertical flat surfaces 32 (FIGS. 3 and 4) of the link body 18 to support the horizontal flat surfaces 34 of the overhanging slats 22.

In this embodiment, the rails 54 not only guide the conveyor chain 10 along a predetermined track but also support the overhanging slats 22 directly. With this arrangement, in an application wherein the gap between one and adjacent conveyor is important as in a crossed delivery conveyor, the conveyor chain 10 can be allowed to travel at an exact position. Further, in case of transferring an article from one to another conveyor, or vice versa, as in a crossed delivery conveyor, a moment acting on the overhanging slats 22 is borne directly by the rails 54; besides, this is done through the horizontal flat surfaces 34. Therefore, no transverse force acts on the conveyor chain 10, making the gap between this and the other conveyor difficult to vary.

Figure 6:
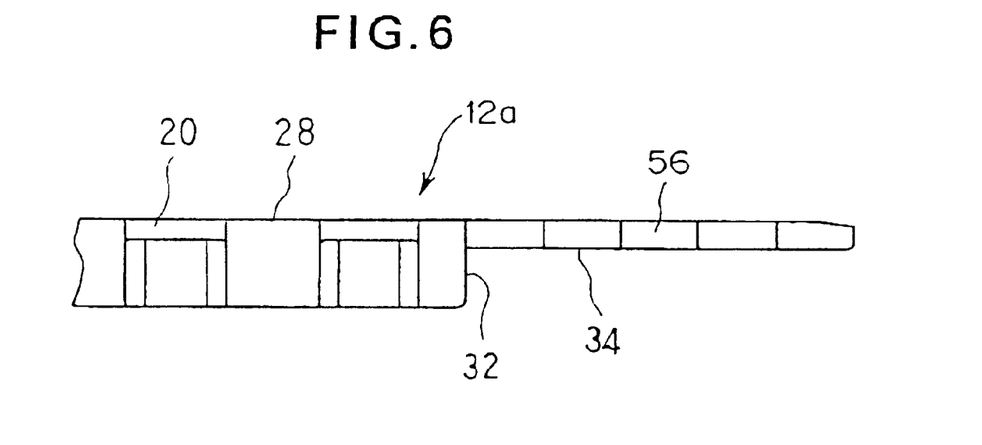
FIG. 6 is a front view of an overhanging slat according to a modification of the present invention.
Figure 7:
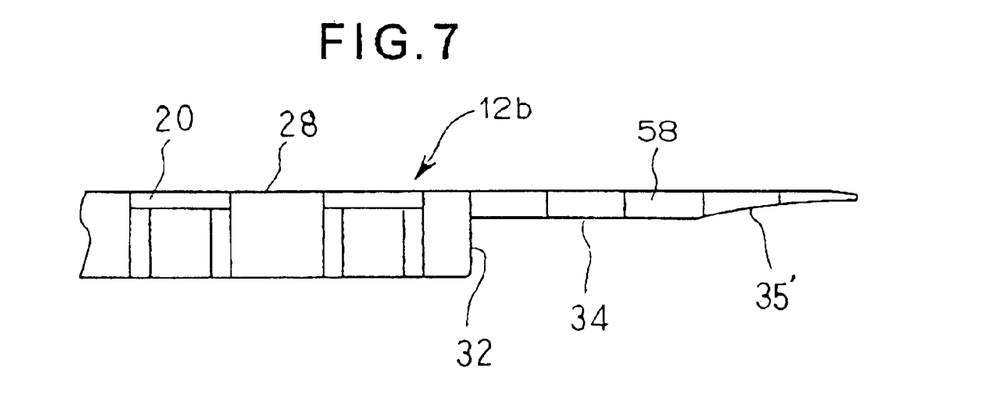
FIG. 7 is a front view showing a further modified form of the overhanging slat.

FIGS. 6 and 7 illustrate other forms of overhanging slats. In the overhanging slats 22 shown in FIG. 3, the wall thickness decreases gradually like a taper toward both side edges in the vicinity of their outer end portions to avoid interference with the other conveyor. The tapered outer end portions each have a flat sloped surface 35 contiguous to the horizontal flat surface 34.

In a link 12a shown in FIG. 6, an overhanging slat 56 thereof extend at a constant wall thickness up to near an end portion thereof. This is suitable for the case of handling heavy articles or the case where articles being carried are less likely to fall down even if there is a relatively large gap between two conveyors.

In a link 12b shown in FIG. 7, an overhanging slat 58 decreases its wall thickness near an outer end portion thereof gradually in an arcuate shape toward both side edges. The outer end portion has an arcuate sloped surface 35' contiguous to the horizontal flat surface 34. Since the underside of the overhanging slat 58 is arcuate near the end portion, it is possible to minimize the gap along the traveling path of the other conveyor. The overhanging slat 58 shown in FIG. 7 is suitable for the case of handling relatively light-weight articles easy to fall down.

According to the present invention, as set forth above, the chain pitch can be shortened so as to suit a stable article conveyance required for a conveyor. When this type of a conveyor is utilized in a crossed delivery conveyor, the pitch of overhanging slats is short in the prior art, increasing the likelihood of an article falling down at the time of transfer of the article between first and second conveyors. In the present invention, the pitch of overhanging slats can be set twice, three times, . . . as large as the conveyor chain pitch. Consequently, there can be attained an outstanding effect such that the falling-down of an article caused by a polygonal motion of the conveyor chain is prevented in the first conveyor used in the crossed delivery conveyor and the article can be transferred stably between the first and second conveyors.

In the second aspect of the invention, since each overhanging slat is provided on the lower surface side thereof with a horizontal flat surface which is supported by a rail of the conveyor, an article present on the overhanging slat is supported horizontally by the rail laid along the underside of the overhanging slat even upon transfer of the article from the article loading portion to the overhanging slat, thus making it possible to prevent tilting of the conveyor chain of the first conveyor.

Further, since the overhanging slats are supported at their horizontal flat surfaces, a horizontal component of a force acts on neither the overhanging slats nor the conveyor chain equipped with the overhanging slats and thus their horizontal movement is prevented. For this reason, even if the gap between the first and second conveyors is made narrow, there is no fear of interference of both conveyors and articles can be transferred stably between both conveyors.

In the third aspect of the invention, since overhanging slats are provided symmetrically right and left, articles can be loaded and discharged in any of both right and left directions of the associated conveyor. Thus, unlike the prior art, it is not necessary to manufacture right and left conveyor chains of different structures, which is economical.

Obviously, various minor changes and modifications of the present invention are possible in the light of the above teaching. It is therefore to be understood that within the scope of the appended claims, the present invention may be practiced otherwise than as specifically described.

What is claimed is:

1. A conveyor chain for use in a crossed delivery conveyor, comprising:

a plurality of links connected together in an endless form, said links being each provided with an article loading portion;

said links being comprised of first links and second links, said first links being each sandwiched in between two adjacent ones of said second links in a conveyance direction of the conveyor chain to constitute an endless conveyor chain;

said first links being each provided with an overhanging slat which extends in a direction orthogonal to the conveyance direction of the conveyor chain from said article loading portion of the first link; and said overhanging slat extending also in the conveyance direction of the conveyor chain along a side edge of said article loading portion of the associated second link, and said overhanging slat of each of the first links being adjacent to the overhanging slats of preceding and succeeding ones of said first links;

wherein said overhanging slat is provided symmetrically right and left of each of said first links in the conveyance direction of the conveyor chain.

2. A conveyor chain for use in a crossed delivery conveyor according to claim 1, wherein said overhanging slat is provided on a lower surface side thereof with a horizontal flat surface adapted to be supported by a rail of the crossed delivery conveyor.

3. A conveyor chain for use in a crossed delivery conveyor according to claim 2, wherein said article loading portion of the first link has a flat article loading surface and said overhanging slat has a flat article loading surface extending flush with said flat article loading surface of the article loading portion, and said overhanging slat extends at a constant thickness up to near an outer end portion thereof.

4. A conveyor chain for use in a crossed delivery conveyor according to claim 2, wherein said article loading portion of the first link has a flat article loading surface and said overhanging slat has a flat article loading surface extending flush with said flat article loading surface of the article loading portion, and said overhanging slat has a thickness decreasing gradually toward a side edge in the vicinity of an outer end portion thereof.

5. A conveyor chain for used in a crossed delivery conveyor according to claim 4, wherein said outer end portion of the overhanging slat has a flat sloped surface contiguous to said horizontal flat surface.

6. A conveyor chain for used in a crossed delivery conveyor according to claim 4, wherein said outer end portion of the overhanging slat has an arcuate sloped surface contiguous to said horizontal flat surface.

* * * * *